(12) United States Patent
Wellman et al.

(10) Patent No.: US 9,873,199 B2
(45) Date of Patent: Jan. 23, 2018

(54) ROBOTIC GRASPING OF ITEMS IN INVENTORY SYSTEM

(71) Applicant: Amazon Technologies, Inc., Seattle, WA (US)

(72) Inventors: Parris S. Wellman, Reading, MA (US); Matthew David Verminski, North Andover, MA (US); Andrew Stubbs, Waltham, MA (US); Robert Michael Shydo, Jr., Pelham, NH (US); Ennio Claretti, Somerville, MA (US); Boris Aronchik, Brighton, MA (US); John Gregory Longtine, Sudbury, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/391,692

(22) Filed: Dec. 27, 2016

(65) Prior Publication Data
US 2017/0106532 A1 Apr. 20, 2017

(51) Int. Cl.
*B25J 9/16* (2006.01)
*B65G 1/137* (2006.01)
(Continued)

(52) U.S. Cl.
CPC .......... *B25J 9/1669* (2013.01); *B25J 9/0084* (2013.01); *B25J 9/1602* (2013.01); *B25J 9/1612* (2013.01);
(Continued)

(58) Field of Classification Search
CPC ..... Y10S 901/30; B25J 9/1664; B25J 9/1669; B25J 9/1612
See application file for complete search history.

(56) References Cited

U.S. PATENT DOCUMENTS

| 4,187,454 A | 2/1980 | Ito et al. |
| 4,704,694 A | 11/1987 | Czerniejewski et al. |

(Continued)

FOREIGN PATENT DOCUMENTS

| WO | 2010122445 | 10/2010 | |
| WO | WO-2010122445 A1 * | 10/2010 | ......... G06K 9/00664 |

OTHER PUBLICATIONS

U.S. Appl. No. 14/572,332, "Final Office Action", dated Jul. 6, 2016, 20 pages.
(Continued)

*Primary Examiner* — Thomas Randazzo
(74) *Attorney, Agent, or Firm* — Kilpatrick Townsend & Stockton LLP

(57) ABSTRACT

Robotic arms or manipulators can be utilized to grasp inventory items within an inventory system. Information can be obtained about constraints relative to relevant elements of a process of transferring the item from place to place. Examples of such elements may include a grasping location from which an item is to be grasped, a receiving location in which a grasped item is to be placed, or a space between the grasping location and the receiving location. The information about the constraints can be used to select from multiple possible grasping options, such as by eliminating options that conflict with the constraints or preferring options that outperform others given the constraints.

20 Claims, 9 Drawing Sheets

(51) Int. Cl.
*G06Q 10/08* (2012.01)
*B25J 9/00* (2006.01)
*B65G 1/04* (2006.01)
*B65G 1/10* (2006.01)

(52) U.S. Cl.
CPC .......... *B25J 9/1664* (2013.01); *B25J 9/1697* (2013.01); *B65G 1/0492* (2013.01); *B65G 1/10* (2013.01); *B65G 1/1378* (2013.01); *G06Q 10/08* (2013.01); *G06Q 10/087* (2013.01); *G05B 2219/39468* (2013.01); *G05B 2219/39473* (2013.01); *G05B 2219/39536* (2013.01); *G05B 2219/39543* (2013.01); *G05B 2219/39546* (2013.01); *Y10S 901/03* (2013.01); *Y10S 901/09* (2013.01); *Y10S 901/30* (2013.01); *Y10S 901/31* (2013.01); *Y10S 901/47* (2013.01)

(56) References Cited

U.S. PATENT DOCUMENTS

| | | | |
|---|---|---|---|
| 5,007,784 A * | 4/1991 | Genov | B25J 9/042 198/471.1 |
| 5,041,907 A * | 8/1991 | Sager | B07C 5/3422 348/91 |
| 6,860,531 B2 * | 3/2005 | Sherwin | B25J 15/0052 294/103.1 |
| 7,894,933 B2 | 2/2011 | Mountz et al. | |
| 8,001,677 B2 | 8/2011 | Sneath et al. | |
| 8,091,782 B2 | 1/2012 | Cato et al. | |
| 8,095,237 B2 | 1/2012 | Habibi et al. | |
| 8,280,547 B2 | 10/2012 | D'Andrea et al. | |
| 8,307,061 B1 | 11/2012 | Hickman et al. | |
| 8,352,074 B2 | 1/2013 | Guochunxu et al. | |
| 8,355,816 B2 | 1/2013 | Saito et al. | |
| 8,630,924 B2 | 1/2014 | Groenevelt et al. | |
| 8,768,512 B2 | 7/2014 | Lim et al. | |
| 8,781,629 B2 * | 7/2014 | Ota | B25J 9/1664 318/568.12 |
| 8,855,814 B2 * | 10/2014 | Kim | B25J 9/1669 294/106 |
| 8,862,269 B2 | 10/2014 | Fuhlbrigge et al. | |
| 8,954,188 B2 | 2/2015 | Toebes et al. | |
| 8,965,562 B1 | 2/2015 | Wurman et al. | |
| 9,004,846 B2 * | 4/2015 | La Rovere | B25J 15/00 294/65 |
| 9,014,857 B2 * | 4/2015 | Ota | B25J 9/1669 700/245 |
| 9,041,508 B2 | 5/2015 | Glickman et al. | |
| 9,092,698 B2 * | 7/2015 | Buehler | B25J 9/0087 |
| 9,102,055 B1 | 8/2015 | Konolige et al. | |
| 9,321,176 B1 | 4/2016 | Sun et al. | |
| 9,333,649 B1 * | 5/2016 | Bradski | B25J 9/163 |
| 9,481,518 B2 * | 11/2016 | Neiser | B65G 1/1373 |
| 9,492,923 B2 | 11/2016 | Wellman et al. | |
| 9,561,587 B2 | 2/2017 | Wellman et al. | |
| 2003/0101107 A1 * | 5/2003 | Agarwal | G06Q 10/087 705/28 |
| 2006/0200274 A1 | 9/2006 | Watanabe et al. | |
| 2007/0140821 A1 | 6/2007 | Garon et al. | |
| 2009/0306825 A1 | 12/2009 | Li et al. | |
| 2010/0179689 A1 | 7/2010 | Lin et al. | |
| 2012/0053728 A1 | 3/2012 | Theodorus et al. | |
| 2012/0143427 A1 | 6/2012 | Hoffman et al. | |
| 2012/0173019 A1 | 7/2012 | Kim et al. | |
| 2012/0259582 A1 | 10/2012 | Gloger et al. | |
| 2013/0184870 A1 | 7/2013 | Ota et al. | |
| 2015/0032252 A1 | 1/2015 | Galluzzo et al. | |
| 2015/0224648 A1 | 8/2015 | Lee et al. | |
| 2015/0273685 A1 * | 10/2015 | Linnell | B25J 9/1664 700/184 |
| 2015/0290802 A1 | 10/2015 | Buehler et al. | |
| 2015/0332213 A1 | 11/2015 | Galluzzo et al. | |
| 2015/0352721 A1 * | 12/2015 | Wicks | B25J 9/1664 700/228 |

OTHER PUBLICATIONS

U.S. Appl. No. 14/572,332, "Non-Final Office Action", dated Dec. 8, 2015, 16 pages.
U.S. Appl. No. 14/572,332, "Notice of Allowance", dated Oct. 4, 2016, 12 pages.
U.S. Appl. No. 14/572,420, filed Dec. 16, 2014, Titled: Generating Robotic Grasping Instructions for Inventory Items.
U.S. Appl. No. 15/289,864, filed Oct. 10, 2016, Titled: Generating Robotic Grasping Instructions for Inventory Items.
PCT/US2015/065628, International Search Report and Written Opinion, dated Mar. 29, 2016, 11 pages.

* cited by examiner

ROBOTIC GRASPING OF ITEMS IN INVENTORY SYSTEM

CROSS-REFERENCE TO RELATED APPLICATIONS

This application is a continuation of U.S. application Ser. No. 14/572,332, filed Dec. 16, 2014, entitled "ROBOTIC GRASPING OF ITEMS IN INVENTORY SYSTEM," which is related to and incorporates by reference for all purposes the full disclosure of U.S. patent application Ser. No. 14/572,420, filed Dec. 16, 2014, entitled "GENERATING ROBOTIC GRASPING INSTRUCTIONS FOR INVENTORY ITEMS," the entire disclosures of which are hereby incorporated by reference in their entireties.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
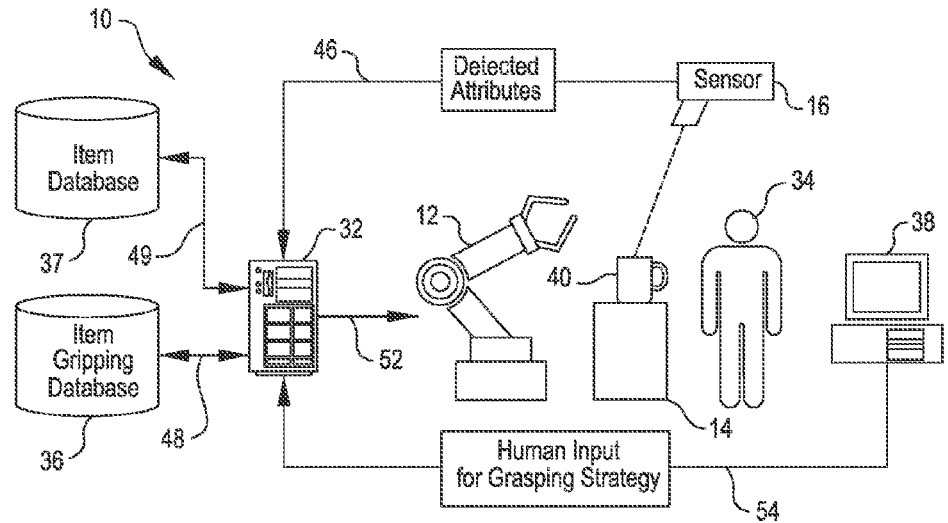
FIG. 1 illustrates an example of an inventory system having a robotic arm configured for grasping inventory items of the inventory system according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to robotic arms or manipulators and associated components that may facilitate the movement of inventory items and other features of the inventory system among and between elements of the inventory system. The robotic arms or manipulators may be controlled so as to grasp items in a manner particularly suited for grasping of a target item. For example, a target item, or characteristics thereof, may be identified, such as by optical or other sensors, in order to determine a grasping strategy for the item. The grasping strategy may be based at least in part upon a database containing information about the item, characteristics of the item, and/or similar items, such as information indicating grasping strategies that have been successful or unsuccessful for such items in the past. Entries or information in the database may be originated and/or updated based on human input for grasping strategies, determined characteristics of a particular item, and/or machine learning related to grasping attempts of other items sharing characteristics with the particular item. Embodiments herein include aspects directed to generating and/or accessing such databases.

Thus, in an illustrative example according to one embodiment, a robotic arm is positioned within reach of a tray. A human operator loads the tray with an inventory item (for example a coffee mug) that is to be grasped by the robotic arm and moved into the appropriate box from a group of boxes that are awaiting ordered items for shipment to customers. The mug in the tray is identified according to a unique identifier number, such as by a scanned barcode or radio frequency identification tag. The unique identifier of the mug is used to access a record about the mug from an item database to determine a stored weight and a stored digital model representing the shape of the mug. A camera or other optical imaging device scans the mug, providing information about the mug's orientation, e.g., in this case that the mug is on its side with the open top facing the camera and the handle to the right. The weight, shape, and orientation of the mug are collectively used with any other relevant and/or available information (e.g., about the size and orientation of the box into which the mug is to be placed to fulfill the order) to query a grasping strategy database for a grasping strategy appropriate for this situation. Assuming multiple strategies are available, the highest ranked strategy is accessed, which in this case causes the robotic arm to use a vacuum end effector (rather than an electromechanical pincher that is also available), approach the mug from the open top to grasp the mug on the bottom inside of the mug using 60% of the robotic arm's suction capacity, and rotate while moving toward the target box so that the mug is set down with the bottom facing down and the handle aligned in the foam slot specially formed in the left side of the box to receive the handle. Alternatively, assuming that no strategies are available for this situation, new grasping strategies may be generated. For example, grasping strategies for similar items (such as, other mugs, other items determined to be similar in shape to mugs, etc.) may be accessed and/or adapted to provide a grasping strategy for the mug presented to the robotic arm. As another example, the human operator may provide input about how the mug may be effectively grasped by the robotic arm, such as by selecting from different options presented on a screen or by donning a glove and grasping the mug so that a grasping strategy for the robotic arm may be generated using information from features on the glove (e.g., pressure sensors, tactile sensors, or fiducial markers used to track the motion of the glove with an optical imaging device). After the robotic arm has performed an instructed grasping strategy in an attempt to grasp the mug, a ranking for the instructed strategy can be determined or updated, such as based on an evaluation of the grasping strategy according to different criteria (e.g., whether the mug was successfully transferred from the tray and/or to the target box, an amount of time elapsed to move the mug using the grasping strategy, and/or whether the mug was damaged during transfer).

Referring now to the drawings, in which like reference numerals and/or names may refer to like elements, FIG. 1 illustrates an inventory system 10 having a robotic arm or manipulator 12 configured to grasp inventory items 40. Although the description herein primarily refers to a robotic arm 12, any other mechatronic or robotic device may be used in lieu of or in addition to an arm. Additionally, the terms "grasping," "gripping," or the like as used herein should be understood to include any physical manipulation of objects, including, but not limited to, picking up, pushing, pulling, compressing, stretching, and moving. The system 10 may include the robotic arm 12, a grasping environment 14, an inventory item 40, a sensor package 16, a controller 32, an item gripping database 36, an item database 37, a human input device 38, and a human operator 34. The item database 37 and the item gripping database 36, although depicted as separate in FIG. 1, may share structure and/or content. The grasping environment 14, which is depicted in FIG. 1 as a platform, such as a table or stand, may correspond to any structure or environment maintaining an item (such as inventory item 40) that is to be grasped by the robotic arm 12. For example, the grasping environment 14 may equally correspond to a bin of an inventory holder, a drawer, a tray, or other structures associated with inventory systems disclosed herein.

The sensor package 16 includes one or more sensors (of like or varying type) arranged to detect the item 40 while the item 40 is being maintained by the grasping environment 14. The sensor package 16 communicates detected attributes (as at 46), such as weight, geometric characteristics (e.g., size, position, or orientation), electrical conductivity, magnetic properties, surface characteristics (e.g., how slippery or porous the item is), deformability, and/or structural integrity of the item 40, to the controller 32. The detected attributes may also include a unique identifier of the item 40, such as a barcode- or RFID-encoded serial number. Based on the detected attributes, the controller 32 may access (as at 49) the item database 37, such as to access a record for the inventory item 40. The record can include information about attributes of the item, such as weight, size, shape, or other physical characteristics of the item. Based on the record from the item database 37 and/or the detected attributes from the sensor package 16, the controller 32 may access (as at 48) an item gripping database 36 to access an item grasping strategy stored for that item or items with similar characteristics. The controller 32 can provide instructions to the robotic arm 12 for gripping the item 40 based on the gripping strategy accessed from the gripping database at 36 (e.g., at 52).

In some scenarios—which may include when a grasping strategy from the item gripping database 36 is not available or not complete—human input for a grasping strategy can be received by the controller 32, as at 54. To this end, the human operator 34 may provide a suggestion regarding how the inventory item 40 should be grasped by the robotic arm 12, and make the suggestion via the human input device 38. As non-limiting examples, the human input device 38 may include a computer interface by which the human operator 34 can input instructions, may observe a human action for grasping an item to learn and/or determine information for forming a grasping strategy, and/or may provide a virtual environment in which the human operator can perform a simulated grasping of the item to obtain information for learning and/or determining a grasping strategy. The grasping strategy instructed by the controller 32 to the robotic arm 12 (e.g., at 52) can be based on a combination of the human input for grasping strategy communicated at 54, the detected attributes communicated at 46, the record accessed from the item database 37 at 49, and/or the information accessed from the item gripping database 36 at 48. The controller 32 may update the item gripping database 36 (e.g., at 48) and/or the item database 37 based on the human input grasping strategy received at 54 and/or detected attributes communicated at 46, either of which may include feedback about the success of the grasping strategy implemented. Such updating and accessing of the item database 37 and/or the item gripping database 36 can allow robotic arms 12 throughout the inventory system 10 (and throughout other inventory systems having access to the item gripping database 36) to be used to effectively move inventory items 40 between elements within the inventory system so as to increase efficiency and throughput.

Figure 2:
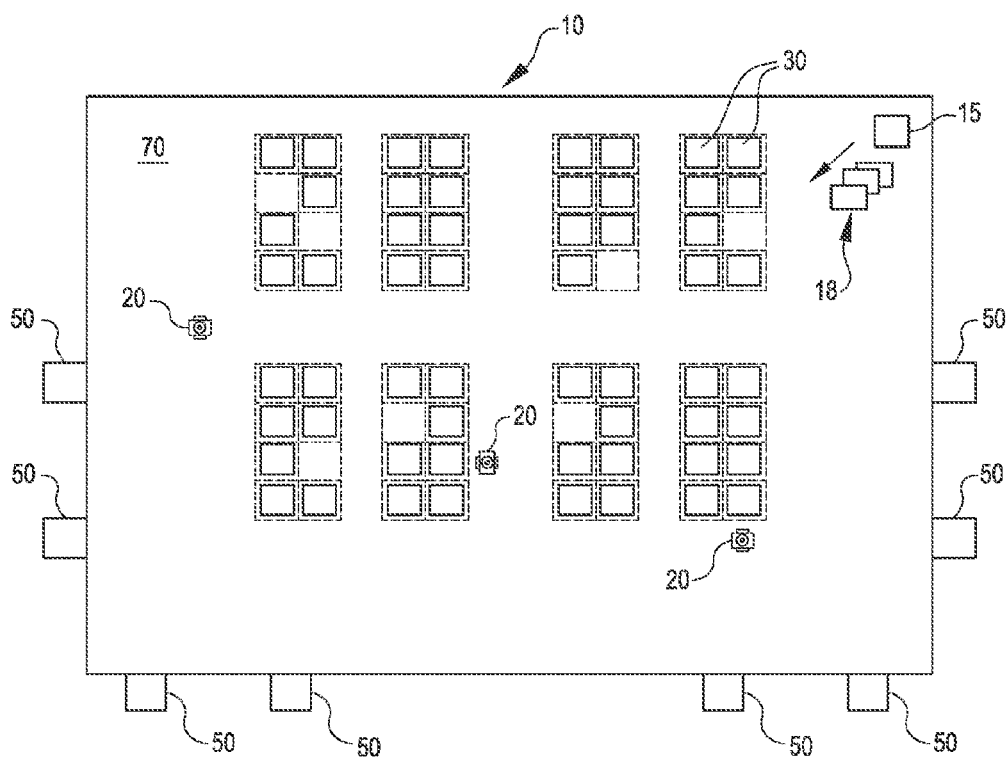
FIG. 2 illustrates components of an inventory system according to particular embodiments.

FIG. 2 illustrates the contents of an inventory system 10 according to some embodiments of the present disclosure. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks.

These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g., from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
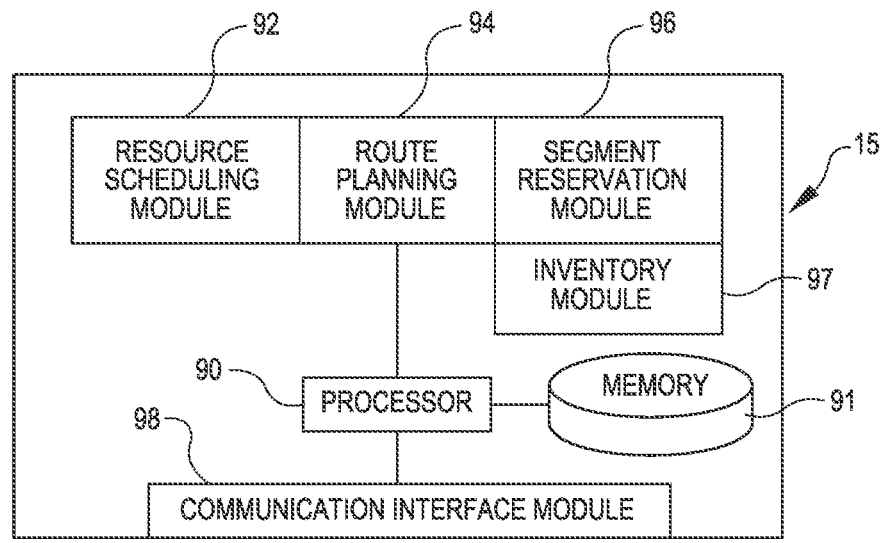
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
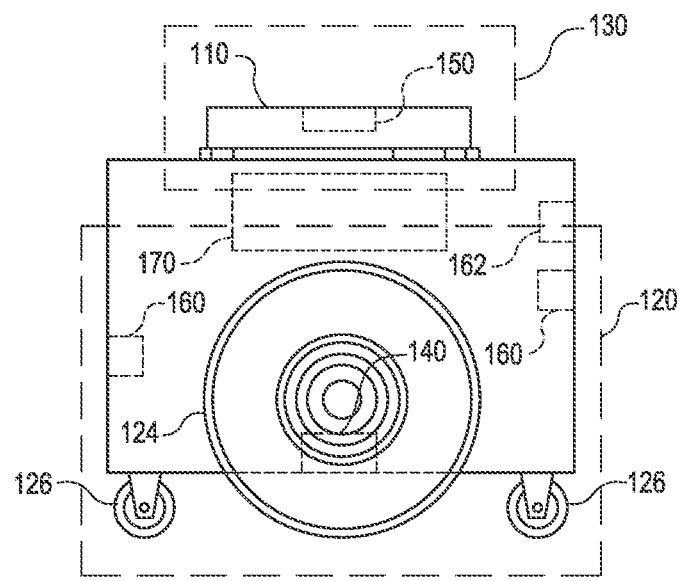
FIGS. 4 and 5 illustrate in greater detail an example mobile drive unit that may be utilized in particular embodiments of the inventory system shown in FIG. 2.
Figure 5:
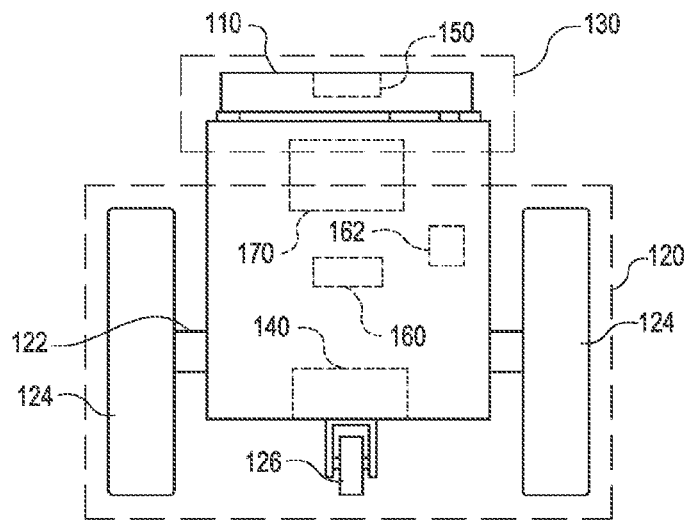

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
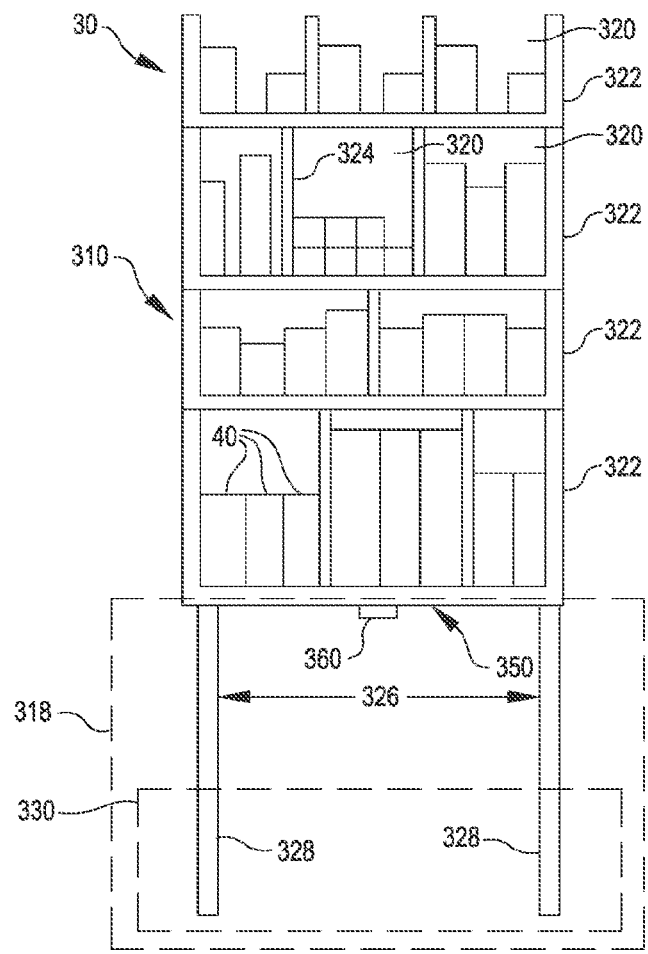
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

Figure 7:
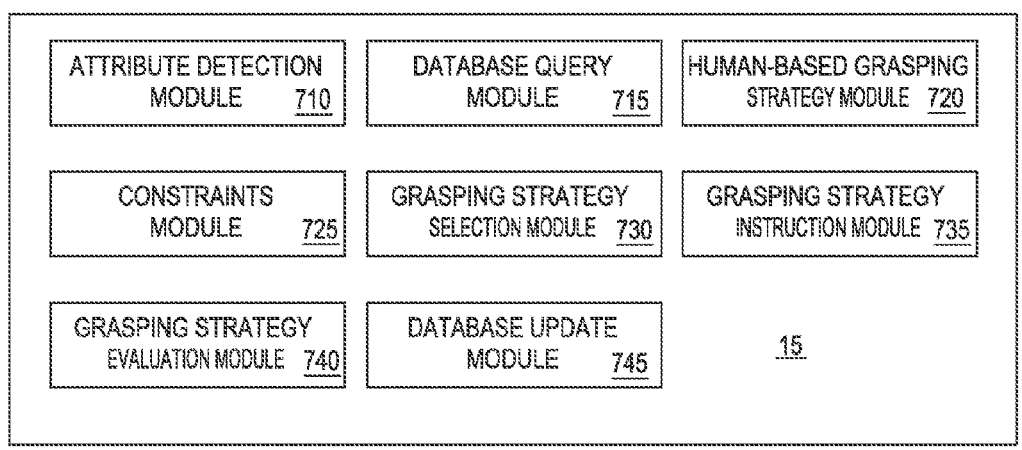
FIG. 7 illustrates in greater detail additional components of an example management module of FIG. 3 according to a particular embodiment.

As described above, embodiments herein are directed to robotic arms or manipulators 12 (hereinafter "robotic arms") and associated components and techniques for automated grasping of inventory items 40 and/or other objects within an inventory system 10. In accordance with some embodiments, the management module 15 is utilized to control operations of robotic arms 12 and the instructions associated therewith. FIG. 7 illustrates in greater detail modules of the management module 15 that may be used in association with robotic arms 12. Example modules are shown in FIG. 7, but functions and embodiments described herein can utilize a subset of the features provided by the modules and/or additional functions can be provided. Additionally, while the example modules will now be briefly discussed with regard to FIG. 7, further specific details regarding the example modules are provided below in the descriptions of subsequent Figures.

As illustrated in FIG. 7, the modules can include an attribute detection module 710, a database query module 715, a human-based grasping strategy module 720, a constraints module 725, a grasping strategy selection module 730, a grasping strategy instruction module 735, a grasping strategy evaluation module 740, and a database update module 745. The attribute detection module 710 receives information from sensors, such as the sensor package 16 of FIG. 1, and determines attributes of inventory items 40 detected by the sensors. The database query module 715 can access information from the item database 37 and/or the item gripping database 36 of FIG. 1, such as based on the information from the attribute detection module 710 or other modules described herein. The human-based grasping strategy module 720 handles requests and receipt of any human input for grasping strategy, such as at 54 in FIG. 1. The constraints module 725 can provide information about constraints to available grasping strategies from various sources, such as information about where an item grasped by a robotic arm 12 is to be placed. The grasping strategy selection module 730 may select and/or determine a grasping strategy to be provided to a robotic arm 12 for a particular grasping action, such as based on information from other modules described herein. The grasping strategy instruction module 735 can provide the instructions embodying the grasping strategy selected by the grasping strategy selection module 730 to the robotic arm 12 for a particular grasping action. The grasping strategy evaluation module 740 can receive information about a grasping action performed in response to instructions provided by the grasping strategy instruction module 735 and evaluate a success of the grasping strategy for the item or attributes of the item involved in the particular grasping action. The database update module 745 may update the item database 37 and/or the item gripping database 36, such as utilizing information from other modules described herein.

The attribute detection module 710 can interact with any number and/or type of sensors to determine attributes of an item to be grasped. For example, the attribute detection module 710 can receive information from imaging devices or optical sensors to determine physical characteristics, such as size, shape, position, orientation, and/or surface characteristics (e.g., how porous and/or slippery the item is based on the surface appearance). Any suitable optical technology can be utilized, including, but not limited to, two-dimensional cameras, depth sensors, time of flight sensing (e.g., broadcasting a source of light and determining a time of reflection for each pixel to determine a distance from the sensor for each pixel to determine a three-dimensional array of data points representing a virtual model of the sensed item and environment), structured light sensing (e.g., projecting a known image from a light source, observing the image as distorted by variations in the surface of the detected item, and analyzing the distortions with respect to the projected image to determine positioning of the features that caused the distortion), stereo sensing (e.g., analyzing differences in images collected from multiple cameras arranged at known offsets from one another to generate a point cloud or digital model), active stereo sensing (e.g., projecting a pattern of light to improve precision of detection of features while using stereo sensing), any other optically-based methodology of observing light for generating a digital representation of a physical object, or any combination thereof.

In some embodiments, the attribute detection module 710 can additionally, or alternatively, receive active sensing information from other sensors (e.g., force sensing, tactile sensing, pressure sensing, voltage sensing, conductance sensing, ultrasonic sensing, x-ray sensing, or other sensing), such as to determine physical attributes of a detected item to be grasped or its surroundings, such as structural integrity, deformability, weight, surface characteristics (e.g., how slippery the item is), or other physical attributes of a detected object.

Information about such physical attributes of an item, as determined based on information from sensors, can be useful for a number of functions. For example, the detected attributes may facilitate identification of an item as an item or type of item that has previously been identified and included in a database or entry in a database of items managed by the inventory system. As an illustrative example, active sensing of deformability may facilitate a determination of whether a set of information received from a sensor corresponds to a bowling ball or a beach ball, which may otherwise have similar three-dimensional geometry.

In some embodiments, a unique identifier may be an attribute detected by the attribute detection module 710. For example, the attribute detection module 710 may determine a UPC or SKU (universal product code or stock keeping unit) of an inventory item based on a barcode detected by an optical scanner or from an RFID tag detected by a RFID reader. Determining a unique identifier of an item may permit or facilitate certain other uses of detected attributes. For example, an item having a unique identifier may have an associated database entry (e.g., from a record in the item database 37 of FIG. 1) regarding anticipated physical attributes of the item that may be used to locate and grasp the item within a particular environment (e.g., identifying a shape of the item based on the unique identifier so that that shape may be located in a detected environment to provide direction to the robotic arm to select the correct item out of a group of items). In some embodiments, a unique identifier may provide confirmation that a grasped item is the item that was intended to be grasped. In some embodiments, information related to the unique identifier may be used to determine if an item is damaged. For example, a barcode for an item may be utilized to determine expected contours of the item or its packaging (e.g., from a record in the item database 37 of FIG. 1), which can be compared with detected information about the item to determine if the item has been damaged or deformed in an unacceptable manner. In some embodiments, detected attributes about an object may be utilized to differentiate or distinguish between different items or conditions of items having the same identifier. As an illustrative example, detected attributes may indicate whether a coffee mug identified by an RFID reader is wrapped in plastic wrap or in a box, which may impact a grasping strategy for gripping the coffee mug. As another illustrative example, a book from one supplier may have the same barcode as a disc from another supplier, and a camera or other optical imaging device may provide information about the size of the detected object in order to distinguish between the two possibilities.

A database query module 715, as mentioned above, may access information about item grasping strategy from a database, such as the item grasping database 36 of FIG. 1. The database query module 715 may additionally or alternatively access records about items from a database, such as from the item database 37 of FIG. 1. In some embodiments, the database query module 715 may receive grasping strategy information based on a detected item being a recognized item (e.g., corresponding to a particular SKU). In some embodiments, the database query module 715 may access grasping strategy information based on detected physical attributes of the item (e.g., a size, shape, position, orientation, weight, or other attributes of the item regardless of a SKU of the item). The database query module 715 may receive information about grasping strategies based on the recognized item and/or characteristics.

A grasping strategy can include any information regarding the manner in which a robotic arm 12 is to attempt to grasp a particular item 40 or group of items. For example, a grasping strategy may include an indication of how the robotic arm is to approach the item to be grasped, an indication of one or more end effectors to be utilized by the robotic arm, and/or an indication of a level of intensity (e.g., amount of force, pressure, voltage, current, etc.) with which the robotic arm is to operate the end effector(s). In some embodiments, the grasping strategy may also include a number of items to be simultaneously grasped.

The approach identified in a grasping strategy may include a direction from which the robotic arm is to approach the item (e.g., from above, from a side, from an angle) and/or a sequence of motions by which the robotic arm is to perform a particular grasping operation, which may include reaching the target item, grasping the target item, moving the target item to a target location, and/or releasing the target item in the target location.

As to end effectors identified in a grasping strategy, the robotic arm 12 may include one or more end effectors and may be capable of utilizing multiple end effectors in conjunction with one another or as alternatives to one another. As illustrative examples, a grasping strategy may call for a number of different robotic arms each having different end effectors or combinations of end effectors, or a grasping strategy may involve activating a combination of end effectors available on a single robotic arm. Any suitable end effector (or number or combination of end effectors) may be utilized, including, but not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferro-magnetic particles capable of altering a size or shape of the fluid volume when subjected to a magnetic field). Vacuum end effectors may grasp items using suction. Electro-adhesion end effectors can include an array of electrodes arranged along a flexible or rigid substrate capable of applying a charge (akin to static electricity) that can adhere an item to the substrate portions that are in contact with the item. Mechanical or electromechanical end effectors may include pinchers, claws, grippers, or other rigid components that may be actuated relative to one another for grasping an item. Other end effectors may also be utilized to facilitate additional grasping techniques. For example, a magnetic or electromagnetic end effector may be useful for grasping items having ferro-magnetic materials.

A grasping strategy can also include an indication of a level of intensity with which the robotic arm is to operate a specific end effector. For example, for a mechanical or electromechanical pincher, a grasping strategy may include an amount of force (e.g., a fixed level or a varying profile) that the pincher is to exert during the grasping operation. Intensity corollaries for other end effectors may include amount of suction for vacuum end effectors, strength of magnetic fields for magnetic or electromagnetic end effectors, current or charge exerted in an electro-adhesion end effector, or level of air pressure exerted to actuate a soft robotic end effector.

The human-based grasping strategy module 720 can provide a mechanism for obtaining information about a manner in which a human would grasp a particular item. In some embodiments, the human-based grasping strategy module 720 may facilitate observation of a human's grasping approach. For example, sensors (such as in the sensor package 16 of FIG. 1) can be configured to detect information while a human is grasping a target item. In an illustrative example, a human wearing a glove or other garment with fiducial markers and/or sensors grasps a particular item. The motion of the human's approach is tracked based on the fiducial markers (e.g., as detected by optical sensors), and other characteristics are tracked based on the sensors (e.g., pressure sensors, tactile sensors, or other sensors may provide data regarding details about an amount and location of pressure that the human exerts on the item throughout the process, shear forces or other indicia translatable into an amount that the object slips in the human's hand, or other information that may be useful in determining a grasping strategy). A grasping strategy is developed by selecting an end effector type, orientation, and intensity that is most capable of mimicking the motion and grip exhibited by the human. In some embodiments, real-time feedback and control of a robotic arm can be provided for a human performing a grasping operation (e.g., haptic feedback or a visual display showing the operation of a robotic arm in response to the human's grasping operation). In some embodiments, the human-based grasping strategy module 720 provides an interface for a human to directly give instructions for how the robotic arm 12 should pick up or grasp a particular item 40. For example, an illustrative user interface is described or shown in FIG. 8. In some embodiments, the human-based grasping strategy module 720 can provide a mechanism for a human to pose the robotic arm 12 in an orientation or position so as to instruct the robotic arm 12 how to grasp a target item. In some embodiments, the human-based grasping strategy module 720 can provide a virtual environment in which a human can perform or direct a grasping action for an item to facilitate machine learning of information for learning, developing, and/or determining a grasping strategy for the robotic arm 12 to grasp a target item.

The constraints module 725 can handle information about factors that may affect or constrain a grasping strategy independent of the identity of the item to be grasped. As an illustrative example, the constraints module 725 may access information about a receptacle into which a grasped item is to be placed so that end effectors that are too large to fit in the receptacle will be eliminated as options for the grasping strategy. In general, the constraints module may provide information about a grasping or receiving environment for the grasped item, such as tray types available for initial presentation for grasping, a size of a receptacle or a receiving zone, a location of a receptacle or receiving zone (such as on the ground, three feet off the ground, five feet from the grasping environment, etc.), a type of receiving environment (such as a tray, shipping box, inventory holder, etc.), a designated orientation of the grasped item when released in the receiving environment (such as if the grasped item is to be presented to a human operator in a particular ergonomically compliant orientation or if the item is to be placed in a particular orientation to facilitate subsequent automated actions).

In some embodiments, the constraints module 725 may provide information about whether a grasped item can be successfully released following a particular initial approach to grasping the item. As an illustrative example, a coffee mug may have a closely-sized box that requires the handle to be facing a side of the box rather than a top or bottom of the box. The constraints module may thus use this information to eliminate grasping strategies (or provide information to the grasping strategy selection module 730) that would grip the coffee mug by the handle and result in the mug being released in the box so that the handle is facing upward. Similarly, the constraints module may determine or indicate an amount of time the different grasping strategies would entail (which may be useful information for the grasping strategy selection module 734 in selecting one grasping strategy over another). In another example, the constraints module 725 may be updated by feedback from the grasping strategy evaluation module 740. For example, the constraints module 725 may provide information derived from other feedback, such as damage reports from third parties (e.g., a customer receiving an order, a supplier of an order, shipping personnel tasked with transporting an ordered item), which may be useful in determining viability of grasping strategies.

The grasping strategy selection module 730 can determine a grasping strategy for a particular item. For example, the grasping strategy selection module 730 may utilize information from any or all of the attribute detection module 710, the database query module 715, the human-based grasping strategy module 720, the constraints module 725, and the grasping strategy evaluation module 740 to determine a grasping strategy for a particular item and the environments in which the item is to be grasped, moved, and/or released. In addition to determining how an item is to be grasped, or as an alternative, the grasping strategy selection module 730 may be involved in determining whether to grasp something using a robotic arm 12. For example, if the attribute detection module 710 detects damage to an item 40, the grasping strategy selection module 730 may instruct an appropriate response, such as selecting a grasping strategy that includes refraining from grasping the damaged item and locating another item of the same type that is undamaged instead.

Based on the grasping strategy selected by the grasping strategy selection module 730, the grasping strategy instruction module 735 may provide appropriate instructions to the robotic arm and other components to effectuate the grasping strategy. For example, the grasping strategy instruction module 735 may instruct movement of a mobile drive unit carrying an inventory holder to a station having a robotic arm, provide instructions to cause a shipping container to be placed in a receiving zone for the robotic arm, and instruct the robotic arm to perform a series of actions to carry out a grasping strategy that facilitates moving an inventory item from the inventory holder to the shipping container.

The grasping strategy evaluation module 740 can evaluate the success of the grasping strategy instructed by the grasping strategy instruction module 735. For example, the grasping strategy evaluation module 740 may evaluate different factors of success of a grasping operation, such as, but not limited to, whether the robotic arm was able to grasp and maintain a grip of the target item, a time elapsed to complete the grasping action, and an indication of whether the target item reached the intended destination and/or in the intended configuration. Such factors may be utilized, for example, for ranking a preference of grasping strategies for certain items and/or item characteristics. The database update module 745 can update records and/or grasping strategies stored in databases, such as the item database 37 and/or the item grasping database 36 of FIG. 1. For example, the database update module 745 may update an item database 37 to update a virtual model of an item having a certain SKU based on sensed attributes determined by the attribute detection module 710 for another item of that SKU. In this way, attributes of an item may be updated over time, by information gathered by different combinations of sensors or different instances of attribute detection. This may be useful, as attributes detected by a single instance of sensing may be based on a single face of an item or otherwise yield less than all information available about that item. The database update module 745 may also update grasping strategies for particular items (e.g., stored in the item grasping database 36 of FIG. 1), such as in response to information received from the grasping strategy evaluation module 740, the human-based grasping strategy module 720, the constraints module 725, or any combination thereof. In this way, a strategy that was successfully implemented by one robotic arm in one location may be rapidly deployed for implementation of a robotic arm in another location in the same workspace or another inventory system having access to database 36.

The database update module 745 may additionally or alternatively update other databases, such as a vendor's item database that contains information about items the vendor has provided through the inventory system. In some embodiments, updating the vendor database may facilitate improvements in a manner in which items are stored in inventory holders as a result of a greater availability of information about the inventory holders and the items to be stored. As an illustrative example, an item that is determined to be of a specific size based on detected attribute information may allow the item to be more efficiently stored in a smaller receptacle and/or along with other items, instead of allocating a larger receptacle for the item based on an inaccurate assumption of the size of the inventory item. In another illustrative example, updating a vendor database may permit savings and shipping cost based on selecting a box more appropriately sized for the shipping item that is determined or verified, at least in part, relative to initial stored data from sensors used for item characterization or attribute detection.

Figure 8:
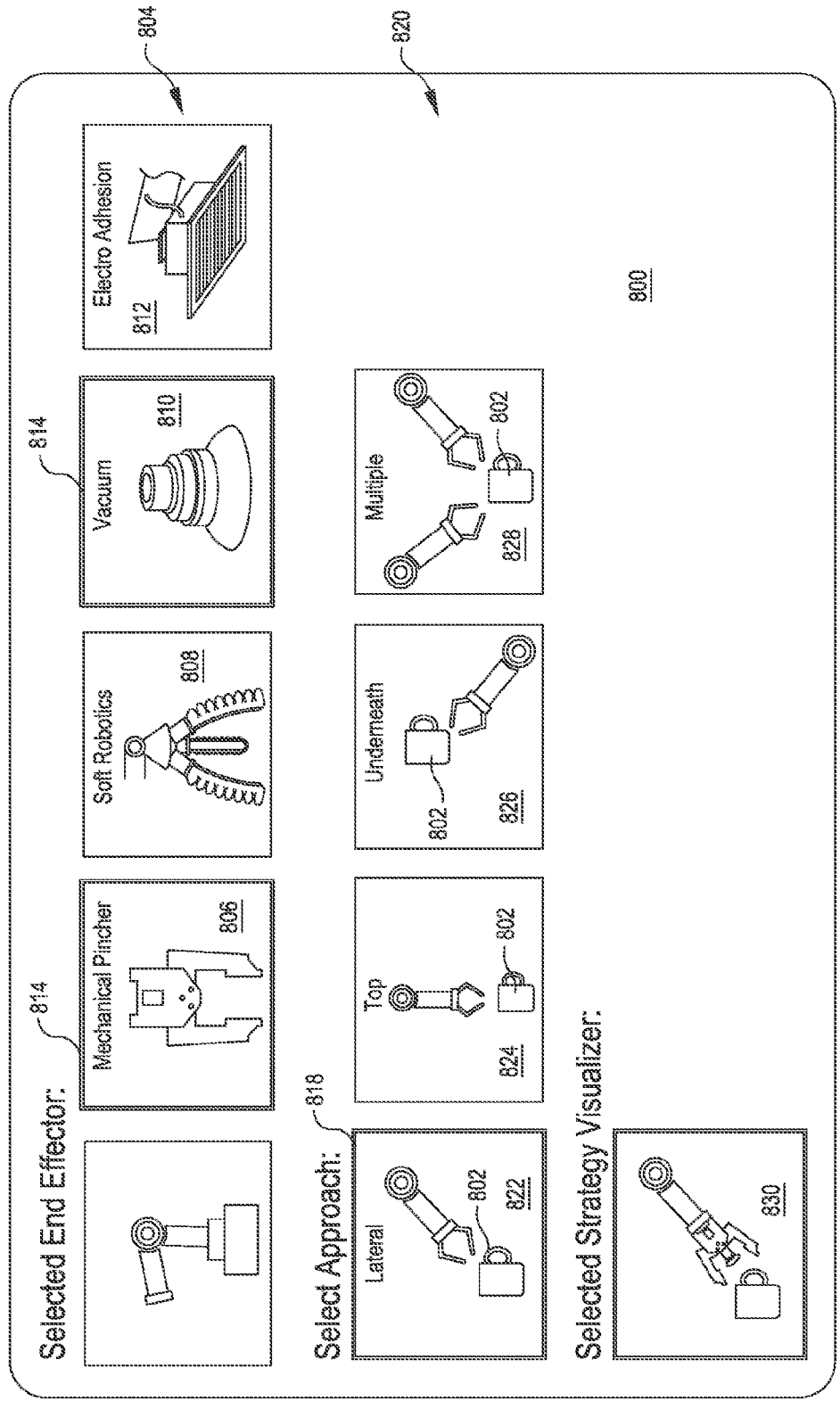
FIG. 8 illustrates an example of a user interface for receiving human input for a grasping strategy according to particular embodiments.

FIG. 8 illustrates an example user interface for obtaining human input for a grasping strategy. The user interface includes a screen showing various selection options that a human user can select to provide input about a grasping strategy for a particular item, e.g., a coffee cup 802. In a first row at 804, the user has options for different end effectors, such as a mechanical pincher 806, soft robotics 808, vacuum 810, or electro-adhesion 812. The user can select one or more of the end effectors as illustrated by the selection boxes 814. In a second row at 820, the user can select an approach for picking up the desired item 802. For example, the presented options may include an angled or lateral approach 822, a top-down approach 824, an underneath approach 826, or a multiple arm approach 828 (in which multiple arms are used for grasping and moving the item 828). The user can select an approach (or more than one approach in the case of multiple robotic arms) as illustrated by the selection box 818. At 830, a visualization of the selected grasping strategy is presented in which the coffee cup is to be grasped at an angle in a lateral approach by a combination of a mechanical pincher and vacuum based on the selections made at 814 and 818.

Figure 9:
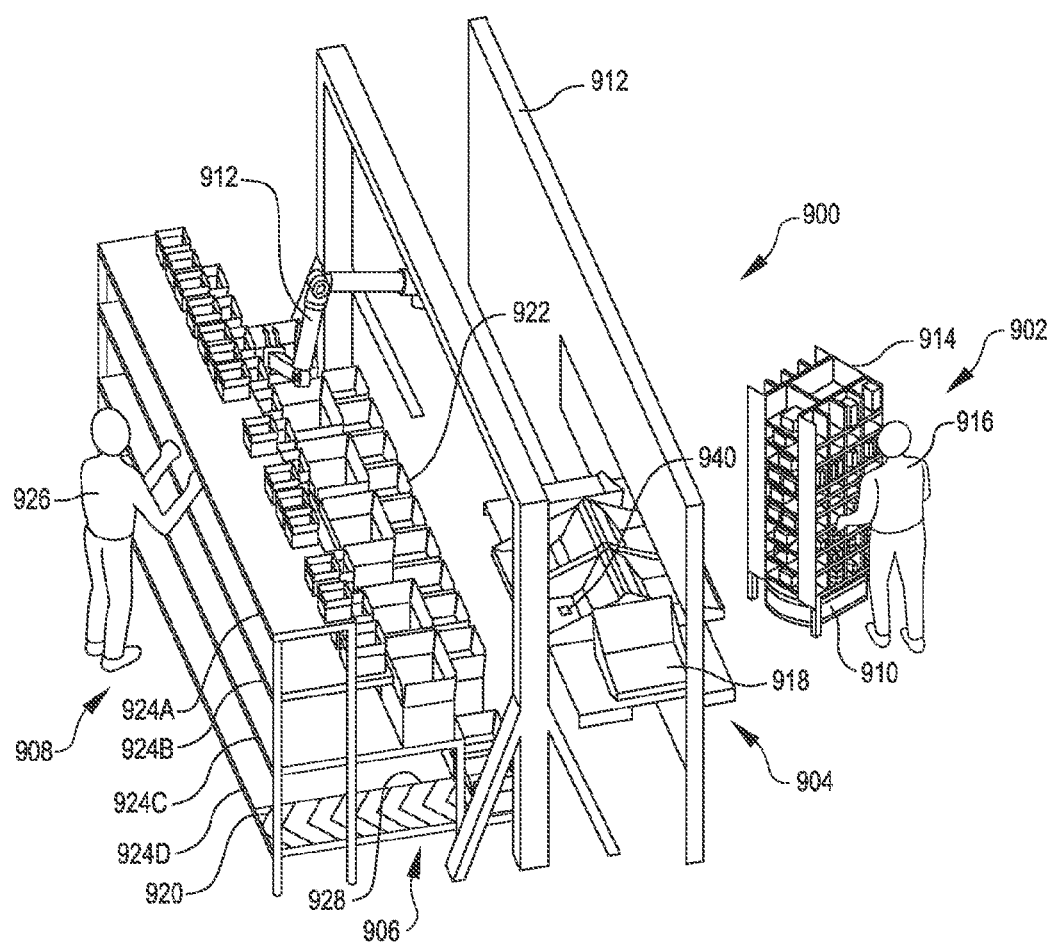
FIG. 9 illustrates an example of a station utilizing a robotic arm for handling of inventory items according to particular embodiments.

FIG. 9 illustrates an example of a station having a robotic arm 912. The station 900 can represent a station 50 described elsewhere herein. The station 900 can include a picking area 902, a grasping area 904, a release area 906, and a packing area 908. The mobile drive unit 910 (e.g., mobile drive unit 20 described elsewhere herein) can bring an inventory holder 914 (e.g., inventory holder 30 described elsewhere herein), to the picking area 902. An operator 916 in the picking area 902 can remove an inventory item 940 from the inventory holder 914 and transfer the inventory item 940 to the grasping area 904 (e.g., to a tray 918). The tray 918 may be one of a plurality of trays in the grasping area 904. In some embodiments, the plurality of trays 918 are moveable so as to bring empty trays into position to be filled by the operator 916 and trays bearing items 40 into a position to be accessed by the robotic arm 912. Multiple and/or movable trays may allow the robotic arm 912 and the operator and 916 to work at different rates and may reduce wait times in a workflow at the station 900. Multiple trays may also facilitate simultaneous, independent operation of multiple robotic arms 912 and/or picking operators 916. In some embodiments, different trays may be provided having differing characteristics that facilitate grasping different types of items (e.g., one tray type with soft lining for grasping fruit and another tray type with features more suited to grasping books).

The robotic arm 912 may receive instructions to perform a particular grasping strategy to move an inventory item 940 from a tray 918 and into the release area 906, e.g., into a box 922 positioned on a shelf 924A-D of a stadium shelving unit 920. The shelves 924A-D of the stadium shelving unit 920 may be different widths, which may permit the robotic arm 912 to access a variety of boxes from above in a manner that also permits the boxes to be accessed along a common vertical face in the packing area 908. Conveyance mechanisms 928 may be provided on any of the shelves 924A-D of the stadium shelving unit 920 to move filled boxes from the release area 906 to the packing area 908, e.g., to within reach of a worker 926 in the packing area 908 for subsequent operations such as packing a box 922 with completed orders for shipping. Although a single conveyance mechanism 928 is depicted in FIG. 9 so as to avoid confusion in the drawing, any number of conveyance mechanisms 928 of any type (e.g., conveyor, pusher, puller) on any shelf 924A-D may be provided to move boxes 922 to the packing area 908. Furthermore, although a stadium shelving unit 920 is depicted in FIG. 9, any other form of transfer mechanism may be utilized to transfer a box or other receptacle with an item received from a robotic arm from a release area 906 to a packing area 908. As illustrative examples, the stadium shelving unit 920 may be augmented or replaced by a conveyor system (e.g., for moving empty and/or loaded boxes relative to the robotic arm 912) or a set of inventory holders movable by mobile drive units. Transfer mechanisms between the release area 906 and the packing area 908 may provide a degree of separation between human operators (e.g., 916 and 926) and the robotic arm 912, for example, to facilitate compliance with safety measures.

In some embodiments, the station 900 can include a sensor package 16 such as described in FIG. 1 with respect to sensor package 16. For example, the robotic arm 912—or other structure associated with the station 900—may include such sensors for identifying items 940 (and/or characteristics thereof), boundaries of boxes 922 in the release area 906 (such as to facilitate release by the robotic arm of the item 940 in a correct box 922), and/or for detecting motions and/or signals performed by an operator 916 (such as an alternate human input device 38 of FIG. 1). Hence, as may be appreciated, grasping strategies may be defined and/or refined at stations specifically designated for determining grasping strategies (e.g., FIG. 1) and/or at stations designated for other inventory functions, such as picking or stowing, e.g., with respect to inventory holders 914 and/or mobile drive units 910 (e.g., FIG. 9).

Figure 10:
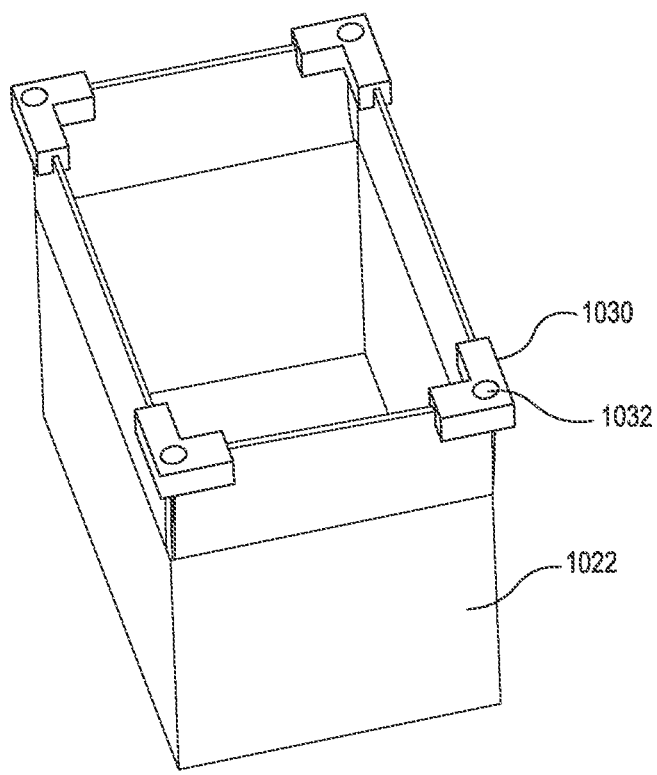
FIG. 10 illustrates in greater detail an example of components that may be utilized in directing the robotic arm of FIG. 9 to an item release location according to particular embodiments.

FIG. 10 illustrates a box 1022 (such as may correspond to a box 922 of FIG. 9) having corner pieces 1030 having fiducial markers 1032. The corner pieces 1030 can retain flaps of the box open for loading by the robotic arm 912. For example, the corner pieces 1030 may be T- or L-shaped to retain perpendicular flaps in position relative to one another. Corner pieces may be constructed of any material. The corner pieces 1030 can include any type of fiducial marker, including, but not limited to barcodes, colors, patterns, alphanumeric text or codes, symbols, other indicia. Such fiducial markers 1032 may provide additional points of reference for sensors used in conjunction with the robotic arm 912 to identify particular boxes in accordance with instructions for moving the robotic arm 912.

Figure 11:
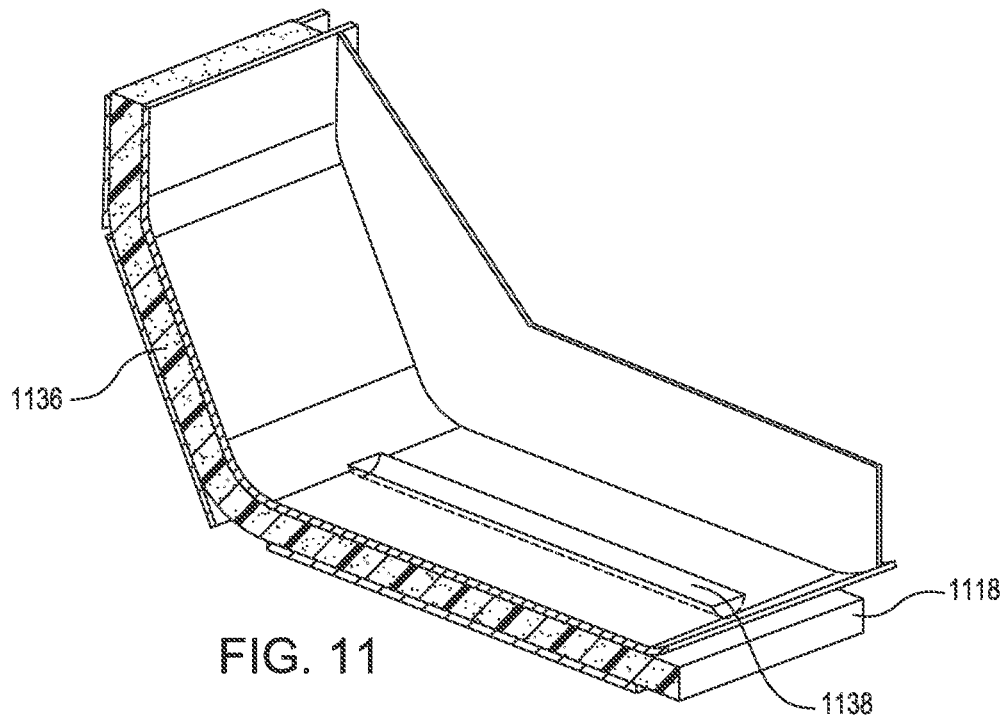
FIG. 11 illustrates a cross-sectional view of a tray of the station of FIG. 9 according to particular embodiments.

FIG. 11 illustrates a cross-sectional view of a tray 1118, such as may correspond to a tray 918 of FIG. 9. The tray can include a layer or surface of deformable material 1136. For example, the deformable material may be foam or gel or any other deformable material that can deform under pressure applied by a robotic arm during an approach that incorporates an element passing underneath or behind the target item. The tray 1118 can additionally, or alternatively, include a fabric layer providing a surface along which the target item can be moved. For example, such a layer of fabric 1136 may provide appropriate friction conditions to facilitate the robotic arm gripping the target item from a position on the tray or moving, e.g., sliding, the target item along the tray to a position where the robotic arm can get an appropriate grip on the target item (e.g., sliding the target item from a lower horizontal position up to an angled position so that a robotic arm can grip the item from a different orientation more in line with a particular grasping strategy). In some embodiments, the tray 1118 includes one or more grooves 1138, which may provide an additional or alternative space for a component of the robotic arm to approach the target item at least partially from underneath. Other alternatives are also possible, including ribs or ridges or projections that would make the grasping surface contoured in such a way as to facilitate grasping of an item at least partially from underneath the item by the robotic arm 912.

Figure 12:
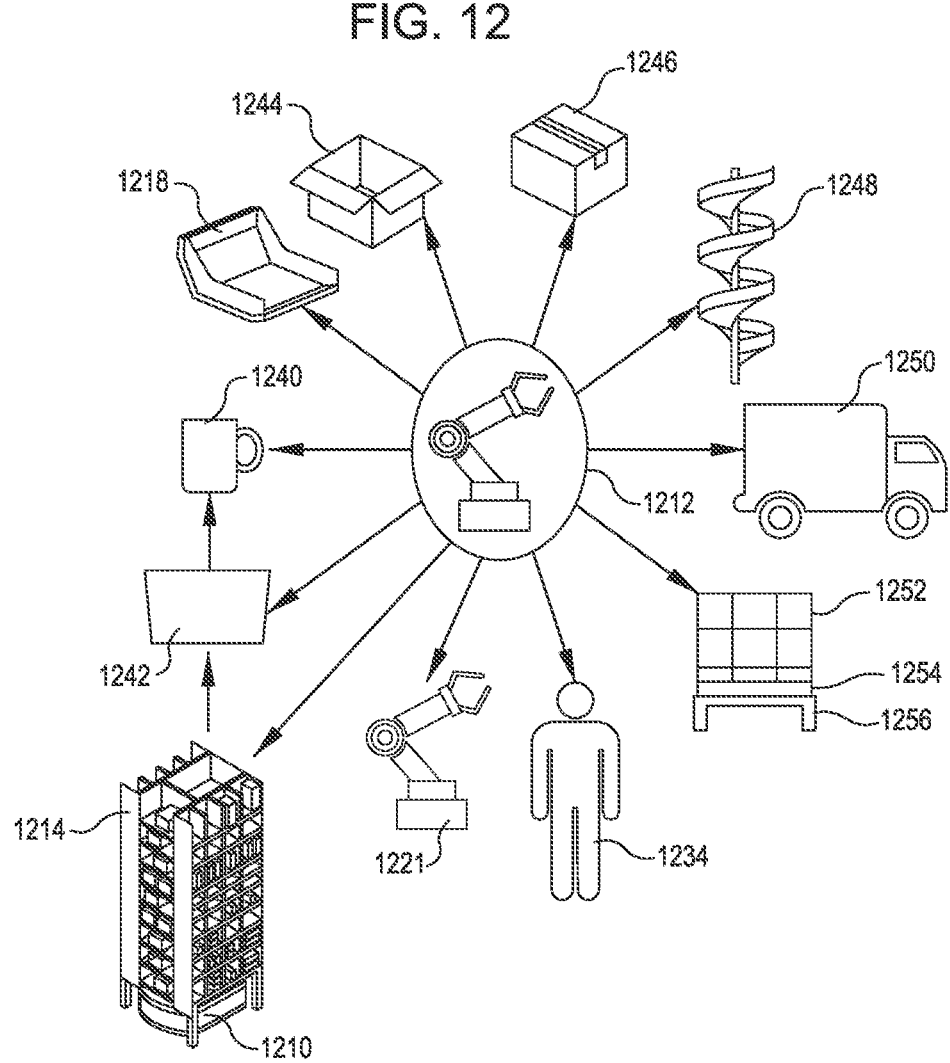
FIG. 12 illustrates examples of inventory system components with which a robotic arm may interact according to particular embodiments.

FIG. 12 illustrates several components of an inventory system with which a robotic arm 1212 can interact. The robotic arm 1212 can move inventory items 1240 to or from open boxes 1244, completed boxes 1246, trays 1218, drawers 1242, inventory holders 1214 (such as may store inventory items accessible for fulfilling orders and/or store inventory items sorted into compiled orders) or associated components of inventory holders 1214 (such as bins, totes, slots, or compartments), delivery or other transport vehicles 1250, conveyance mechanisms 1248 (such as spirals or other conveyors, chutes, or ramps), pallets 1254 (and/or any structure 1256 supporting the pallet 1254 or receptacles 1252 stacked on the pallet), and/or any other any other elements of an inventory system. The robotic arm 1212 may interact with human operators 1234 and/or other robotic arms 1221 to accomplish such movements of inventory items 1240 and/or to facilitate other functions involving the human operators 1234 or other robotic arms 1221. Furthermore, in addition to (or as alternatives to) grasping or otherwise facilitating movement of individual inventory items 1240, the robotic arm 1212 may also grasp or otherwise facilitate movement of other components of the inventory system, including, but not limited to the tray 1218, open boxes 1244, closed boxes 1246, drawers 1242, bins, totes, pallets 1254, structures 1256, or receptacles 1252 shown in FIG. 12.

As one of many illustrative examples, the robotic arm 1212 can interact with a tray 1218, such as moving an inventory item 1240 to or from the tray 1218, e.g., to an open box 1244 or from a human operator 1234. In some aspects, a robotic arm 1212 may remove or replace a drawer 1242 or other bin, tote, or receptacle with respect to an inventory holder 1214 (such as may be moved by mobile drive unit 1210). The robotic arm 1212 may move the drawer 1242 to or from an ergonomically appropriate position at which a human operator 1234 (or other robotic arm 1221) may perform prior or subsequent actions with the item 1240. In some aspects, the robotic arm 1212 may directly move items 1240 to or from storage locations within the inventory holder 1214. The robotic arm 1212 may grasp and move open boxes 1244 (such as empty or partially-filled boxes) or closed and sealed boxes 1246 to or from pallets 1254, inventory holders 1214, conveyance mechanisms 1248, and/or delivery vehicles 1250.

Figure 13:
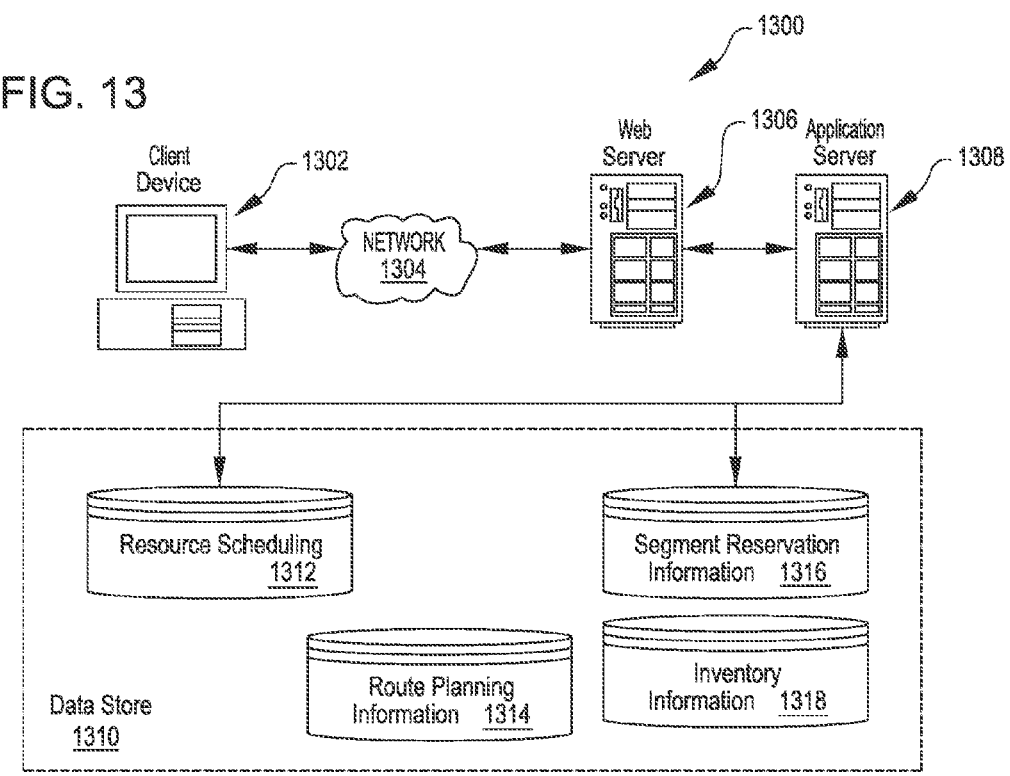
FIG. 13 illustrates an environment in which various features of the inventory system can be implemented, in accordance with at least one embodiment.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing information which can be used by modules described herein, such as resource scheduling information 1312, route planning information 1314, segment reservation information 1316, and/or inventory information 1318. Furthermore, the management module 15 of FIG. 2 and/or FIG. 7, and all modules included therein, can be stored in data store 1310. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®° and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system for transferring items between grasping locations and receiving locations, comprising:
    a plurality of robotic end effectors for grasping items for transfer between grasping locations and receiving locations, the plurality of robotic end effectors including at least a first robotic end effector at a station and a second robotic end effector at the station; and
    a management module configured to:
        identify a particular item to be subject to a transfer process;
        identify a particular grasping location from which the particular item is to be grasped for the transfer process;
        identify a particular receiving location into which the particular item is to be placed for the transfer process;
        determine constraint information about constraints of at least one of the particular grasping location, the particular receiving location, the first end effector, the second end effector, or a space for travel between the particular grasping location and the particular receiving location;
        perform a first evaluation, based at least in part on the constraint information, of a first grasping strategy for performing the transfer process by the first end effector;
        perform a second evaluation, based at least in part on the constraint information, of a second grasping strategy for performing the transfer process by the second end effector;
        select, based at least in part on the first evaluation and the second evaluation, a selected grasping strategy so that the selected grasping strategy includes either the first grasping strategy for performing the transfer process by the first end effector or the second grasping strategy for performing the transfer process by the second end effector; and
        generate instructions to cause either:
            the first end effector to perform the first grasping strategy for performing the transfer process in response to the first grasping strategy being the selected grasping strategy; or
            the second end effector to perform the second grasping strategy for performing the transfer process in response to the second grasping strategy being the selected grasping strategy.

2. The inventory management system of claim 1, wherein the constraint information comprises information about a space restriction related to performance of the transfer process relative to at least one of the particular grasping location, the particular receiving location, the first end effector, the second end effector, or a space for travel between the particular grasping location and the particular receiving location.

3. The inventory management system of claim 1, wherein the constraint information comprises information about an amount of time related to performance of the transfer process relative to at least one of the particular grasping location, the particular receiving location, the first end effector, the second end effector, or a space for travel between the particular grasping location and the particular receiving location.

4. The inventory management system of claim 1, wherein the management module is further configured to:
    determine a set that includes at least some grasping strategies that the first robotic end effector is capable of performing and at least some grasping strategies that the second robotic end effector is capable of performing; and
    eliminate grasping strategies from the set based on the constraint information so as to obtain the plurality of grasping strategies from which the selected grasping strategy is selected.

5. A non-transitory computer-readable storage medium having stored therein instructions that, when executed by one or more processors of a computer system, cause the computer system to perform operations comprising at least:
    determining a plurality of grasping strategies that differ from one another for performing a transfer process by robotic end effector of an item from a grasping location to a receiving location;
    determining constraint information relative to each grasping strategy of the plurality of grasping strategies;
    evaluating each grasping strategy of the plurality of grasping strategies based on the constraint information;
    selecting a selected grasping strategy from among the plurality of grasping strategies based at least in part on the evaluating and such that the selected grasping strategy includes a selected robotic end effector selected from among multiple available robotic end effectors based at least in part on the constraint information; and
    generating instructions for causing the selected robotic end effector to perform the selected grasping strategy.

6. The non-transitory computer-readable storage medium of claim 5, wherein the plurality of grasping strategies differ from one another by at least one of type of robotic end effector utilized, a robotic end effector path of travel toward the grasping location, a robotic end effector path of travel toward the receiving location, a robotic end effector path of travel between the grasping location and the receiving location, or a portion of the item grasped by the robotic end effector.

7. The non-transitory computer-readable storage medium of claim 5, wherein the constraint information includes information about constraints of the grasping location.

8. The non-transitory computer-readable storage medium of claim 7, wherein the grasping location comprises a mobile inventory holder.

9. The non-transitory computer-readable storage medium of claim 5, wherein the constraint information includes information about constraints of the receiving location.

10. The non-transitory computer-readable storage medium of claim 7, wherein the constraint information includes information about packaging located at the receiving location and for receiving the item.

11. The non-transitory computer-readable storage medium of claim 7, wherein the constraint information includes information about an orientation in which the item is to be placed at the receiving location by the transfer process.

12. The non-transitory computer-readable storage medium of claim 5, wherein the constraint information includes information about constraints of the available paths of travel between the grasping location and the receiving location.

13. A method comprising, under the control of one or more computer systems configured with executable instructions:
- determining constraint information relative to a transfer process of an item from a grasping location to a receiving location;
- evaluating, based at least in part on the constraint information, a plurality of grasping strategies for performing the transfer process by robotic end effector;
- selecting, based at least in part on the evaluating, a selected grasping strategy from the plurality of grasping strategies such that the selected grasping strategy includes a selected robotic end effector selected from among multiple available robotic end effectors based at least in part on the constraint information; and
- generating instructions for causing the selected robotic end effector to perform the selected grasping strategy.

14. The method of claim 13, wherein the constraint information comprises information about space restrictions of the grasping location.

15. The method of claim 13, wherein the constraint information comprises information about space restrictions of the receiving location.

16. The method of claim 13, wherein the constraint information comprises information about space restrictions of available paths of travel for the robotic end effector between the grasping location and the receiving location.

17. The method of claim 13, wherein the constraint information comprises information about time associated with performing the transfer process relative to at least one of the grasping location, the receiving location, a type of the robotic end effector, or available paths of travel for the robotic end effector between the grasping location and the receiving location.

18. The method of claim 13, wherein the selected grasping strategy differs from at least one other grasping strategy of the plurality of grasping strategies by at least a type of end effector utilized.

19. The method of claim 13, wherein the selected grasping strategy differs from at least one other grasping strategy of the plurality of grasping strategies by at least an amount of time for performing the transfer process.

20. The method of claim 13, wherein the selected grasping strategy differs from at least one other grasping strategy of the plurality of grasping strategies by at least an approach of the robotic end effector toward at least one of the grasping location or the receiving location.

* * * * *